United States Patent [19]
Christenson et al.

[11] 3,991,216
[45] Nov. 9, 1976

[54] BEVERAGE CONTAINERS COATED WITH A WATER BASED LINER

[75] Inventors: Roger M. Christenson, Gibsonia; Rudolf Maska, Pittsburgh, both of Pa.

[73] Assignee: PPG Industries, Inc., Pittsburgh, Pa.

[22] Filed: Aug. 13, 1975

[21] Appl. No.: 604,512

Related U.S. Application Data

[60] Division of Ser. No. 494,688, Aug. 5, 1974, which is a continuation-in-part of Ser. No. 470,480, May 16, 1974, abandoned.

[52] U.S. Cl. ............................. 426/131; 220/1 BC; 220/64; 426/398
[51] Int. Cl.² ........................................... B65D 1/12
[58] Field of Search ............ 260/29.4 UA, 29.6 TA, 260/29.6 HN; 220/1 R, 1 BC, 64; 426/131, 398

[56] References Cited
UNITED STATES PATENTS

| | | | |
|---|---|---|---|
| 3,037,963 | 6/1962 | Christenson | 260/21 |
| 3,117,693 | 1/1964 | Vogel | 117/75 |
| 3,247,139 | 4/1966 | Christenson et al. | 260/29.6 HN |
| 3,860,549 | 1/1975 | Sekmakas | 260/29.6 TA |

FOREIGN PATENTS OR APPLICATIONS 766,103   8/1967   Canada

*Primary Examiner*—Eugene C. Rzucidlo
*Attorney, Agent, or Firm*—Frank J. Troy

[57] ABSTRACT

Water-based coating compositions for use as internal sanitary liners for metal containers containing beer, carbonated and noncarbonated soft drinks, and fruit juices consist essentially of aqueous dispersions of amine-solubilized interpolymers, said interpolymers being formed from substituted carboxylic acid amide units; ethylenically unsaturated acid units; hardening units from monomers such as styrene, vinyl toluene or alkyl methacrylates having from 1 to 4 carbon atoms and flexibilizing units from certain alkyl acrylates or methacrylates. The interpolymers are solubilized by neutralizing the acid units of the interpolymer with monomeric amines. In order to produce a stable composition, the amount of amine utilized in neutralizing the acid groups of the interpolymer should be sufficient to produce at least 0.200 milliequivalents of salt per gram of resin solids. These compositions provide containers with cured liners which do not impart undesirable turbidity or taste characteristics to the beer, soft drink, or fruit juices packaged therein.

4 Claims, No Drawings

3,991,216

BEVERAGE CONTAINERS COATED WITH A WATER BASED LINER

CROSS REFERENCES TO RELATED APPLICATIONS

This application is a division of copending application Ser. No. 494,688, filed Aug. 5, 1974, which in turn, now abandoned is a continuation-in-part of copending application Ser. No. 470,480, filed May 16, 1974.

BACKGROUND OF THE INVENTION

Beer, carbonated and non-carbonated soft drinks, and fruit juices (hereinafter referred to generically as beverages) are often packed in containers made from aluminum, tin-free steel, blackplate or tinplate, which is cold rolled steel to which a thin layer of tin is applied. Many of these beverages exert corrosive action upon the metal and in order to adequately protect the container and to prevent contamination of the packaged material, a sanitary liner must be applied to the internal surface of the container. However, the use of such liners also presents several problems, one of the most troublesome being the residual turbidity and taste which tends to result from some liner materials.

Because of their relatively taste-free characteristics, vinyl polymers based on vinyl chloride have been extensively employed in sanitary liners in contact with beverages. While such vinyl polymers have been useful in the past, they possess a serious disadvantage which diminishes their usefulness as sanitary liners at the present time. Thus, these vinyl polymers are generally applied from volatile organic solvent solutions at relatively low solids contents and these solvent rich solutions either add to hydrocarbon air pollution or require expensive control equipment.

In recent times, the increased emphasis on safety and environmental pollution problems have resulted in a need for water-based compositions for such liners. By "water-based" it is meant compositions in solvents comprised predominantly of water, thus greatly reducing the handling and emissions of organic solvent vapors. However, the types of solvent-based sanitary liners known and used heretofore are not obtainable as satisfactory water-based systems; indeed, it has been found that water-based materials as a class generally provide liners which impart undesirable turbidity and taste characteristics to beverages, even when the other necessary properties of such liners can be obtained.

The combination of properties which is necessary to successful utilization of any composition for container liners, and which has not been satisfactorily obtainable in water-based sanitary lining compositions known heretofore, includes the following:

A. PROPERTIES OF THE CURED LINER:

1. Metal Adhesion - Excellent adhesion to metals, including the aluminum, tin-free steel, blackplate and tinplate employed in beverage containers; this property permits the present compositions to be utilized either as a one-coat liner or as a primary and/or a topcoat in a two-coat system.

2. Taste Characteristics - Taste characteristics at least as good as the best "tasteless" vinyl polymers applied from solvent solutions and utilized extensively in the container industry at the present time.

3. Turbidity Resistance - Beverages after packing, pasteurization and storage must not develop undesirable turbidity and loss of appearance.

4. Fabricating Properties - Fabricating properties represent a combination of flexibility, extensibility and adhesion so as to permit forming operations to be carried out on the coated metal without cracking or otherwise impairing the continuity of the film.

5. Pasteurization Resistance - Beer is generally pasteurized at a temperature of 150° F. for 15 to 40 minutes; occasionally during the pasteurization temperatures as high as 160° F. to 180° F. may be reached.

6. Low Bake Properties - The curing or baking temperature in containers of the class described should not be excessively high because the exterior of some containers may be coated with lithographic coatings and inks which may discolor and lose their appearance at high temperatures. In addition, some containers employ adhesives as bonding agents and such adhesives are adversely affected by high baking temperatures.

7. Extractability - No undesirable materials may be extracted from the liner during processing and storage.

8. Intercoat Adhesion - In order to permit use of primer or base coat, if desired, or added coats to repair defects, the liner composition should have good adhesion to itself and other conventionally utilized materials.

B. PROPERTIES OF THE UNCURED COMPOSITION:

1. Application Properties - Application by equipment and methods conventionally employed in the coatings industry. Thus, the composition should be capable of being applied by methods such as dipping, roll coating, spraying and the like.

2. Storage Stability - The coating composition must be in a physical form which permits handling and storage over varying conditions. Water-based compositions in emulsion form, for example, usually are not storage-stable unless additives are employed which generally are undesirable in liners for containers used for comestible products.

Compositions containing amide interpolymers have been suggested for use on the exterior and, to some extent, on the interior of containers, e.g., see U.S. Pat. Nos. 2,870,117 and 3,117,693 and Canadian Pat. No. 766,103. However, none of these patents describe a water-based composition for use as a sanitary liner.

SUMMARY OF THE INVENTION

The present invention relates to a water-based coating composition for use as an internal sanitary liner for metal containers adapted for packing beverages, said composition consisting essentially of:

A. from about 5 percent to about 60 percent by weight of an amine-neutralized or partially-neutralized interpolymer formed in the presence of a vinyl polymerization catalyst and in the absence of mercaptan, said interpolymer being comprised of:

1. from about 5 percent to about 25 percent of acrylamide or methacrylamide, the amide being reacted (before, during or after polymerization) with formaldehyde and alkanol to form units of the structure:

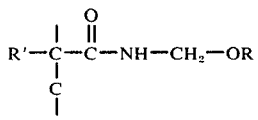

where R' is methyl or hydrogen and R is hydrogen or lower alkyl with at least 50 percent of the groups represented by R being lower alkyl;

2. from about 3 percent to about 25 percent of units formed by vinyl polymerization of an ethylenically unsaturated carboxylic acid selected from the group consisting of acrylic acid, methacrylic acid, itaconic acid, crotonic acid, and maleic acid and half esters of maleic and fumaric acid;

3. from about 5 percent to about 75 percent of units derived by vinyl polymerization of hardening monomer selected from the group consisting of styrene, vinyl toluene and alkyl methacrylates having from 1 to 4 carbon atoms; and 4. from about 5 percent to about 75 percent of units formed by vinyl polymerization of flexibilizing monomer selected from the group consisting of alkyl methacrylates having up to 13 carbon atoms in each alkyl group and alkyl methacrylates having 5 to 16 carbon atoms in each alkyl group, wherein said interpolymer is solubilized by neutralizing or partially neutralizing the acid groups of said interpolymer with a sufficient amount of monomeric amine to produce at least 0.200 milliequivalents of salt per gram of resin solids; and B. from about 40 percent to about 95 percent by weight of a liquid medium consisting of a mixture of a water-soluble or water-miscible organic solvent and water wherein at least 60 percent by weight of the mixture is water.

The above compositions meet all the requirements for cured sanitary liners set forth above. Thus, these compositions exhibit the following properties:

Metal adhesion - excellent adhesion to aluminum, tin-free steel, blackplate, tinplate, and other metals is obtained; no primer is necessary.

Taste characteristics - extensive taste tests have confirmed that these liners provide taste characteristics which make them acceptable to the beverage industry.

Turbidity resistance - no turbidity is imparted to beverages and appearance after storage is unaffected.

Fabricating properties - metal coated with these compositions can be used in forming operations without rupturing or cracking the coating.

Pasteurization resistance - these coatings are not affected by temperatures as high as 200° F., well above the temperature reached during pasteurization of beer.

Low bake properties - the coatings depending on their precise formulation may be effectively cured at temperatures below 340° F., a temperature which is acceptable.

Extractability - in contrast to previous water-based coatings tested, these compositions do not release undesirable components. Testing of the preferred systems show them to meet Food and Drug Administration guidelines in this respect.

Intercoat adhesion - adhesion of successive coats and adhesion to other materials, such as epoxies, vinyls, polybutadiene, etc., is satisfactory.

It has also been found that the compositions of this invention can be applied with existing equipment without the foaming problems normally encountered in the application of previous water-based coating compositions. It has been further found that the compositions of the invention can be prepared without employing additives such as mercaptan chain transfer agents, conventional surfactants and dispersion stabilizers and the like. This is an advantage in that it provides for coating compositions having acceptable storage stability but which upon curing provide films which are substantially free of additives which are undesirable in film compositions used for sanitary liners.

DETAILED DESCRIPTION OF THE INVENTION

In formulating a coating composition for use as an internal sanitary liner for metal containers in which beverages are to be stored, it is extremely important that cured films produced from such coating compositions do not contain certain materials, even in residual amounts, which can be extracted by the beverage from the cured film. Thus, it has been found that certain additives commonly employed in the preparation of prior art coating compositions may remain in residual amounts in cured films produced from such compositions and that even residual amounts of such additives can adversely affect the characteristics of beverages in contact with such films. For example, residual amounts of such materials as mercaptan chain transfer agents commonly employed in polymerizing interpolymers such as those used and described herein; external surfactants or dispersion stabilizers; and external cross-linking agents such as amine-aldehyde resins in cured films employed as sanitary liners for beverages such as beer have been found to exert adverse effects on the turbidity and/or taste characteristics of the beer. Accordingly, in formulating the compositions of this invention, such materials are avoided.

As indicated above, the term "beverage" as used throughout the specification and claims refers to beer, carbonated and non-carbonated soft drinks, fruit juices, and the like.

Among the units in the interpolymers herein are units derived from acrylamide or methacrylamide. These units may be formed from substituted amides, such as N-(alkoxyalkyl)acrylamide or methacrylamide. N-(alkoxyalkyl)acrylamides or methacrylamides in which the alkoxy group is butoxy (i.e., where R in the formula above is butyl) are especially preferred since interpolymers prepared from such substituted amides exhibit the best balance of stability and efficient curing. In addition, mixtures of N-(alkoxyalkyl)acrylamide and N-methylolamide can also be used. These substituted amides can be prepared by several methods. One preferred method is to react an unsaturated amide (e.g., acrylamide) with formaldehyde and an alkanol (e.g., butanol) under acidic conditions and in the presence of a polymerization inhibitor. For a detailed description of this method, see U.S. Pat. No. 3,079,434, incorporated herein by reference. The resultant N-(alkoxyalkyl)acrylamide [e.g., N-(butoxymethyl)acrylamide] is then interpolymerized with the other monomers (described below) to form the interpolymer containing the substituted amide units.

As indicated, in the above method the substituted amide units of the interpolymer herein are formed by first separately preparing the substituted amide and then interpolymerizing it with the other monomers. Alternatively, these substituted amide units can be formed in situ, that is, the substituted amide units can be formed subsequent to the formation of the interpolymer. Thus, the unsaturated amide (e.g., acrylamide or methacrylamide) can first be interpolymerized with the other monomers and the resultant product then reacted with the aldehyde (e.g., formaldehyde) and alkanol (e.g., butanol). For a more detailed discussion of this reaction, see U.S. Pat. No. 3,037,963, incorporated herein by reference. This method has the disadvantage of requiring removal of any excess formaldehyde which has a troublesome odor, and in this method the degree of etherification of the methylol groups is more difficult to control; thus, in the above structure, the proportion of R groups which are alkyl rather than hydrogen may not be as desired. For good stability at least 50 percent of these groups should be alkyl, and usually it is preferred that all or nearly all be alkyl.

As described above, the acrylamide or methacrylamide is in units of polymerized amide substituted with alkoxymethyl groups, with the alkoxymethyl substituent introduced either as part of the amide reactant or by reacting the polymerized amide with formaldehyde and alkanol. It has been the practice in the art to describe the proportion of amide in these interpolymers by reference to the unsubstituted amide, e.g., acrylamide or methacrylamide. This is because the alkoxymethyl groups may or may not be present in the monomer mixture used to form the interpolymer, and if present may be of different molecular weight depending on the particular group, and also because these groups split off and are substantially lost during the baking of the interpolymer coating. That practice is followed throughout the specification and claims herein in referring to the proportion of amide. Thus, for example, an interpolymer described as containing 10 percent acrylamide may be formed from a monomer mixture containing 10 percent acrylamide itself (and the interpolymer later reacted with formaldehyde and alkanol), or the interpolymer may be formed from a monomer mixture containing N-(alkoxymethyl)acrylamide in an amount which would provide an interpolymer containing 10 percent of the acrylamide moiety if the alkoxymethyl groups were removed. Where the latter is the case in the examples, it is so indicated by stating the component as "Acrylamide as NBMA."

The interpolymer of the compositions of this invention contains from about 5 percent to about 25 percent of acrylamide or methacrylamide, with the preferred range being from about 10 percent to about 15 percent.

For similar reasons, the levels of salt groups in the partiallyneutralized interpolymers, as described in detail below, are calculated herein based on interpolymers containing unsubstituted amide, i.e., not having alkoxymethyl substituents. The calculated values correspond closely to experimental values based on the non-volatile solids content of the interpolymer as obtained by heating at 150° C. for 2 hours, thus simulating the losses incurred in the baking operation during which alkoxymethyl groups are evolved.

The units of the interpolymer derived from ethylenically unsaturated carboxylic acid are best formed from acrylic acid or methacrylic acid, but itaconic acid, crotonic acid, and maleic acid, and half esters of maleic and fumaric acids may also be used. In the half esters, one of the carboxyl groups is esterified with an alcohol, the identity of which is not significant so long as it does not prevent polymerization or preclude the desired utilization of the product. Butyl hydrogen maleate and ethyl hydrogen fumarate are examples.

The interpolymer of the compositions of this invention may contain from about 3 to about 25 percent of such acid units. However, for the best balance of curing and ease of solubilization, it is preferred that the interpolymer contain from 5 to 15 percent of the acid units. It shall be noted that interpolymers of the compositions in some instances contain more acid than is normally required for solubilization purposes. This is often desirable in order to obtain satisfactory curing of the interpolymer.

The other units in the interpolymer are derived from a combination of hardening and flexibilizing monomers, to provide the desired combination of properties. The hardening monomer is generally styrene, but others such as vinyl toluene or alkyl methacrylates having from 1 to 4 carbon atoms can also be used.

The interpolymer of the compositions of this invention may contain from about 5 to about 75 percent of units derived from hardening monomers with a preferred range being from about 40 to about 60 percent of such units.

The flexibilizing monomer component is one or more alkyl or substituted alkyl esters of acrylic acid or methacrylic acid, the alkyl groups having 1 to 13 carbon atoms in the case of acrylic esters and 5 to 16 carbon atoms in the case of methacrylic esters. Ethyl acrylate, butyl acrylate, and 2-ethylhexyl acrylate, 2-ethylhexyl methacrylate, decyl methacrylate and lauryl methacrylate are examples. Ethyl acrylate is especially preferred. The interpolymer of the compositions of this invention may contain from about 5 to about 75 percent of units derived from flexibilizing monomers with a preferred range being from about 20 to about 50 percent of such units.

The compositions of this invention may contain from about 5 percent to about 60 percent by weight, preferably 15 to 40 percent by weight, of the interpolymer, the balance being the liquid medium.

The interpolymer is formed by polymerization in the presence of a vinyl polymerization catalyst. The preferred catalysts are azo compounds, such as, for example, alpha, alpha'-azobis(isobutyronitrile). Other useful catalysts are tertiary-butyl perbenzoate, tertiary-butyl pivalate, isopropyl percarbonate and similar compounds. In some instances, other free radical catalysts such as benzoyl peroxide and cumene hydroperoxide may also be useful.

As indicated above, the polymerization is carried out in the absence of a mercaptan. This is an important consideration because it has been the practice, as illustrated by the above patents, to employ small amounts (e.g., one percent to 3 percent) of a mercaptan as a chain transfer agent in the preparation of amide interpolymers of this desired type. It has been found that the presence of even these small amounts of mercaptan in the interpolymer composition results in compositions which are unsuitable for use in sanitary liners for beer and similar beverages. When a mercaptan is present, the lining imparts an undesirable taste characteristic to the beverage, especially on storage for a period of several weeks. Since packed beverages are normally packed for some period of time before they are used, this precludes the utilization of such interpolymer compositions as liners for these containers.

The compositions of this invention are composed of dispersions of the above-described interpolymers in a liquid medium. The liquid medium may consist entirely of water in some cases but, more commonly, will consist of a mixture containing a major proportion of water and a minor proportion of water-soluble or water-miscible organic solvents.

Suitable organic solvents are the ether type alcohols, such as ethylene glycol monobutyl ether (ethyl Cellosolve) and the like, and lower alkanols having 2 to 4 carbon atoms such as ethanol, propanol, isopropanol, butanol, and the like. Minor proportions of hydrocarbon solvents such as xylene, toluene, and the like may also be present in the liquid medium. Mixtures of the ether type alcohols and lower alkanols can also be used. The preferred water-soluble, or water-miscible organic solvents are mixtures of butyl Cellosolve and isopropyl alcohol. The liquid medium portion of the compositions of this invention may contain from about 60 percent to about 100 percent, preferably 80 percent, by weight of water and from about 0 percent to about 40 percent, preferably 20 percent, by weight of water-soluble or water-miscible organic solvent. In any event, the liquid medium will contain at least 60 percent by weight of water. It should be noted that while ordinary tap water can be used in the composition of this invention, deionized or distilled water is preferred. Based on total weight of the composition, the composition may contain from about 40 percent to about 95 percent, preferably 60 to 85 percent, by weight of the liquid medium.

The interpolymer herein is rendered water-reducible or dispersible by the addition of a monomeric amine solubilizing agent. As is known in the art, acid group-containing interpolymers such as those employed in the present compositions can be rendered water-soluble or water-reducible by neutralizing or partially neutralizing the acid groups therein with amines. In general, the monomeric amines employed herein for that purpose may be any of the amines used for solubilizing resin systems known heretofore, including ammonia, ethyl amine, butylamine, dimethylamine, cyclohexylamine, morpholine, monoethanolamine, diethanolamine, diethylethanolamine, and the like. The preferred amines herein are monoethanolamine and dimethylethanolamine with dimethylethanolamine being particularly preferred since it has been found to provide the best results. While, as indicated above, amines may in general be used, there are certain considerations which should be taken into account in choosing the amine used to neutralize any particular system; for example, some amines are more effective than others in providing stable compositions, depending upon the degree of neutralization of the interpolymer.

The term "degree of neutralization" refers to the amount of acid in the interpolymer (as determined theoretically) which has been neutralized with amine. Thus, for example, if 20 percent of the theoretical amount of acid in the interpolymer has been neutralized with amine, the degree of neutralization is 20 percent theoretical neutralization; if 30 percent of the theoretical amount of acid has been neutralized, the degree of neutralization is 30 percent theoretical neutralization, and so forth. In all cases, the degree of neutralization and the amount of amine is sufficient to provide a stable composition, which is defined as one which does not separate into distinct phases, and retains its application properties on storage. When it is desired that this be accomplished at a relatively low degree of neutralization, i.e., below about 30 percent, the preferred amines, dimethylethanolamine and monoethanolamine, should be used. At higher degrees of neutralization (i.e., 30 percent or above), other amines are effective. Thus, for example, at 30 percent theoretical neutralization, diethylethanolamine produces good results and at say 50 percent theoretical neutralization, essentially all of the above-listed amines are suitable.

The amount of amine employed in producing the water-based coating compositions of this invention is an important aspect of the invention. This amount is particularly significant at lower degrees of neutralization of the interpolymer if a stable composition is to be obtained.

The amount of amine employed in producing the water-based coating composition of this invention may in some cases be as low as an amount sufficient to produce 0.180 milliequivalent of salt per gram of resins solids, but ordinarily will be an amount sufficient to produce at least 0.200 milliequivalent of salt per gram of resin solids. The term "milli equivalents of salt per gram of resin solids" refers to the number of acid milliequivalents per gram of resin solids of the interpolymer which have been neutralized with a base (i.e., an amine). The number of milliequivalents of salt per gram of resin solids can be determined by calculation using the following formula:

$$\frac{\text{Weight fraction of acid} \times 10}{\text{Equivalent weight of acid}} \times N = \text{Milliequivalents of salt per gram of resin solids}$$

wherein N is the degree of neutralization. A degree of neutralization greater than 100 percent indicates that excess base has been used. In this latter situation, the value of 100 perent is used in the above calculation. As indicated above, the compositions of this invention will ordinarily contain at least 0.200 milliequivalents of salt per gram of resin solids.

The upper limit in the amount of amine employed is somewhat less important and is governed to a large degree by the method of application. Thus, for example, if the composition is to be applied by brushing, roll coating or dipping, the amine may be used in an amount which will produce as much as 3.47 milliequivalents of salt per gram of resin solids. However, preferably, even in the above methods the amount of amine employed does not exceed an amount which will produce 1.910 milliequivalents of salt per gram of resin solids. Moreover, when the composition is to be applied by spraying, the amount of amine employed ordinarily should not produce more than 0.764 milliequivalents of salt per gram of resin solids although in some instances an amount of amine which will produce up to about 1.40 milliequivalents of salt per gram of resin solids may be used.

The preferred method for producing water-based coating compositions of this invention comprises the steps of (a) polymerizing the substituted amide, ethylenically-unsaturated acid, hardening and flexibilizinb monomers in an escess of a mixture of water-soluble or water-miscible organic solvents, the solvent mixture consisting essentially of an ethertype alcohol selected from the group consisting of ethyl Cellosolve and butyl Cellosolve and a lower alkanol selected from the group consisting of ethanol, propanol, isopropanol and butanol, wherein the excess solvent in the mixture is essentially the lower alkanol, in the presence of a polymerization catalyst to form the interpolymer in solution; (b) stripping off the excess solvent consisting essentially of lower alkanol by distillation at atmospheric pressure, under vacuum, or both; (d) adding monomeric amine to the interpolymer solution; (d) adding water to the interpolymer solution under conditions of agitation to form a dispersion of the interpolymer; and (e) heat aging the dispersion at temperatures of from about 70° C. to about 90° C., while maintaining conditions of agitation until the viscosity of the dispersion is substantially constant.

The term "excess" as employed with reference to the organic solvent mixture in step (a) above means that the total amount of organic solvent mixture employed in the polymerization process exceeds the total amount of organic solvent desired in the final composition. The period of heat aging, i.e. step (e), depends upon several factors, such as the composition of the interpolymer, the solids content of the composition, the initial viscosity of the interpolymer formed, the degree of agitation and the like. In general, the heat aging period can range from one hour or less up to about 11 hours.

In a particularly preferred embodiment of the above method, the above-described monomers are polymerized in an excess of a solvent mixture consisting essentially of butyl Cellosolve and isopropanol, wherein the excess solvent of the mixture is essentially isopropanol, in the presence of an azo polymerization catalyst to form the interpolymer in solution. Then, the excess solvent consisting essentially of isopropanol is stripped off by distillation at atmospheric pressure or under vacuum, or both, following which the monomeric amine is added to the interpolymer solution. Then deionized water at a temperature ranging from 50° C. to 99° C. (i.e., hot water) is added to the solution to form a dispersion of the interpolymer and finally the interpolymer dispersion is heat aged as in step (e) above.

The preferred embodiment of preparing the water-based coating compositions of this invention provides a number of significant and important advantages. First, the use of butyl Cellosolve and isopropanol as the solvent mixture provides a significant advantage because of the wide difference in the boiling points of these materials (i.e., butyl Cellosolve = 171.2° C., isopropanol = 82.4° C.). This difference is boiling points permits the ready removal (e.g., by distillation) of isopropanol from the mixture. Accordingly, where as here, the excess solvent (as defined above) employed in the polymerization procedure is essentially isopropanol, such excess is readily removable and the total solvent content of the final composition is more easily controlled. Secondly, the isopropanol in the solvent mixture functions as a chain-transfer and molecular weight control agent in this system. Hence, in the preferred embodiment, isopropanol effectively controls the molecular weight of the interpolymer without the necessity of using an external or added chain transfer agent, such as the mercaptan chain transfer agents normally employed in polymerizing interpolymers of this type. Finally, the addition of hot water to the interpolymer solution is advantageous in that it aids in the formation of the interpolymer dispersion and permits the more rapid attainment of coating composition viscosity.

As indicated, the above-described methods are directed to the preparation of the preferred water-based coating compositions in which a portion of the organic solvent originally employed in the polymerization of the interpolymer remains in the final resin composition. However, as indicated previously in the specification, water-based coating compositions in which the liquid medium is entirely water are also contemplated as being within the scope of this invention. Such compositions may be obtained by following the above-described methods and then employing an additional separation procedure following step (e). Thus, for example, the organic solvent remaining in the composition after step (e) can be removed by various separation procedures such as distillation, liquid chromatography and the like.

The water-based coating compositions of this invention can be applied by methods conventionally employed in the coatings industry, such as brushing, dipping, roll coating, spraying, and the like and they are particularly adapted to be applied by the methods used to coat containers. In this regard, it should be observed that the exact formulation of the coating composition employed herein (e.g., total solids, viscosity, etc.) will depend upon the desired manner in which the composition is to be applied. Thus, within the compositional limitations set forth in the specification above, compositions having suitable application properties (e.g., solids contents, viscosity, etc.) can be readily selected for the the method of application desired. Such a determination is well within the skill of those in the coating art.

After application, the compositions are ordinarily dried and cured by baking at elevated temperatures to produce a hard, thermoset film. The baking schedules depend upon the nature of the particular composition, the nature of the substrate, and the manner in which it is to be used. In general, the water-based coating compositions of this invention can be cured by using typical baking schedules employed in the container industry. Typical baking schedules for such container coatings employ temperatures ranging from about 300° F. to about 420° F. and times ranging from about 2 minutes to about 15 minutes.

The following examples are submitted to further illustrate the nature of the present invention and are not intended as a limitation on the scope thereof. All parts and percentages used in the examples and throughout the specification, are by weight unless otherwise indicated. The solids contents reported in the examples were run at 105° C. as a quality control test.

EXAMPLE 1

This example illustrates the preparation of a water-based coating composition of this invention.

Into a reactor equipped with reflux condenser, heating means, stirrer, thermometer and nitrogen feed liner were charged 159.0 grams of ethyl Cellosolve, 325.0 grams of isopropanol, and 290 grams of a monomer mixture consisting of 5.9 percent glacial acrylic acid, 28.2 percent of a 61.5 percent solids solution of N-(butoxymethyl)acrylamide (NBMA) in a 1:3 solvent mixture of toluene and butanol, 32.1 percent of styrene, 32.5 percent of ethyl acrylate and 1.3 percent alpha, alpha'-azobis(isobutyronitrile) catalyst (based on monomer solids, the monomer charge contains 10 percent acrylamide NBMA, 41 percent styrene, 41.5 percent ethyl acrylate and 7.5 percent acrylic acid). The charged mixture was then heated under nitrogen to reflux temperature (about 90° C–93° C.) in a period of about 45 minutes. After reflux had begin, an additional 1081 grams of the above monomer mixture were added to the reactor over a period of about 3 hours. Then 12.0 grams of t-butyl perbenzoate were added in 3 equal increments (i.e., 4 grams each) over a period of about 6 hours with each increment being added at two-hour intervals. At the end of the six-hour period, 337 grams of solvent (slightly more than the original amount of isopropanol used) were stripped from the resultant interpolymer solution by distillation at atmospheric pressure at a temperature of about 94° C. over a period of about 75 minutes. At this point, a sample of the reaction mixture was analyzed for total solids content and found to have a solids content measured at 150° C. of 73 percent by weight. Then 49.8 grams (50 percent theoretical neutralization) of dimethyl ethanolamine were added to the reaction mixture (temperature of the mixture about 97° C.). After addition of the dimethyl ethanolamine was completed, 1939 grams of deionized water preheated to 75° C. was added to the reaction mixture with stirring and the stirring was continued for about one hour after the addition of deionized water was completed.

The water-based coating composition resulting from the above procedure is a dispersion of interpolymer in a liquid medium, the composition has the following formulation:

| Interpolymer | Interpolymer Units (Percent) |
| --- | --- |
| Acrylamide as NBMA* | 10.0 |
| Styrene | 41.0 |
| Ethyl acrylate | 41.5 |
| Glacial acrylic acid | 7.5 |
| Liquid Medium | Percent by Weight |
| Deionized water | 83.8 |
| Organic solvents** | 16.2 |

*N-(butoxymethyl)acrylamide
**A mixture consisting of ethyl Cellosolve, isopropanol, toluene and butanol.

The composition has the following properties:

| | |
| --- | --- |
| Polymer solids: | 33.4 percent by weight of total composition |
| Liquid Medium: | 65.6 percent by weight of total composition |
| Viscosity: | 140 centipoises, Brookfield viscosity at 77° F., Spindle No. 4 at 20 r.p.m. |
| Acid No. | 16.1 |
| Milliequivalents of salt per gram of resin solids: | 0.521 |
| Stability: | Good |

The composition was drawn down on a metal substrate and baked for two minutes at 375° F., producing a smooth, hard and durable film.

EXAMPLE 2

In this example, Example 1 was repeated except that the amount of dimethyl ethanolamine used to neutralize the interpolymer was reduced by 40 percent (to 30 percent theoretical neutralization) and the amount of isopropanol increased by 10 percent to adjust the viscosity. The finished composition had the following properties:

| | |
| --- | --- |
| Polymer solids: | 35 percent by weight of total composition |
| Liquid medium*: | 65 percent by weight of total composition |
| Viscosity | 100 centipoises, Brookfield viscosity at 77° F., No. 4 spindle at 20 r.p.m. |
| Acid No.: | 17.43 |
| Milliequivalents of salt per gram of resin solids: | 0.314 |
| Stability: | Good |

*85 percent by weight of deionized water and 15 percent by weight of organic solvents.

The composition when drawn down on a metal substrate and baked for 2 minutes at 375° F. produced a smooth, hard and durable film.

EXAMPLE 3

This example illustrates the preparation of a preferred water-based coating composition of the invention in which the ether-type alcohol employed was butyl Cellosolve.

Into a reactor having the same equipment as in Example 1 were charged 477 grams butyl Cellosolve, 975 grams of isopropanol and 870 grams of the monomer mixture of Example 1 with the alpha, alpha'-azobis-(isobutyronitrile) catalyst removed. The charged mixture was then heated under nitrogen to reflux employing the same conditions as in Example 1. After the onset of reflux, an additional 3189 grams of the monomer mixture of Example 1 and 54 grams of alpha, alpha'-azobis(isobutyronitrile) catalyst were added to the reactor over a three-hour period as in Example 1. Following this addition, 12.0 grams of t-butyl perbenzoate were added to the reactor using the addition procedure of Example 1. Then 981 grams of organic solvent were removed by distillation at atmospheric pressure at temperatures ranging from about 95° C. to about 120° C. Subsequently, 89.4 grams (30 percent theoretical neutralization) of dimethyl ethanolamine were added to the reaction mixture. After this addition, 5085 grams of deionized water preheated to 75° C. were added to the reaction mixture with stirring as in Example 1.

The resultant water-based coating composition has the following formulation:

| | Percent by weight total solids = 38.5 |
| --- | --- |
| Interpolymer | Interpolymer Units (Percent) |
| Acrylamide as NBMA | 10.0 |
| Styrene | 41.0 |
| Ethyl acrylate | 41.5 |
| Glacial acrylic acid | 7.5 |
| | Percent by weight total liquid = 61.5 |
| Liquid medium | Percent by weight |
| Deionized water | 83.5 |
| Organic solvents* | 16.5 |

*Consisting of butyl Cellosolve, isopropanol, toluene and butanol.

The composition had the following properties:

| | |
| --- | --- |
| Total solids: | 38.5 percent |
| Acid number: | 17.7 |
| Viscosity: | 300 centipoises, Brookfield viscosity at 77° F., No. 4 Spindle at 20 r.p.m. |
| Milliequivalents of salt per gram of resin solids: | 0.313 |
| Stability: | Good |

The composition when drawn down on a metal substrate and cured as in the preceeding examples produced a smooth, hard and durable film.

EXAMPLE 4

In this example, a water-based coating composition was prepared in accordance with the manner used in Example 3, except that additional butyl Cellosolve was employed to increase the organic solvent content of the composition. The composition had the following formulation:

|  | Total Weight |
|---|---|
| Interpolymer as in Example 3 | 37.5% |
| Liquid medium | 62.5% |
|  | Percent by Weight |
| Deionized water | 79.5 |
| Organic Solvents | 20.5 |

The composition had the following properties:

| Total solids: | 37.5 percent |
|---|---|
| Viscosity: | 16.5 seconds, No. 4 Ford cup |
| Acid No. | 18.6 |
| Milliequivalents of salt per gram of resin solids: | 0.313 |
| Stability | Good |

The composition when applied to a metal substrate and cured as in Examples 1–3 produced a smooth, hard and durable film.

EXAMPLES 5–8

These examples illustrate the critical effect of the degree of neutralization and thus the amount of salt produced per gram of resin solids on the stability of the water-based coating compositions of this invention.

In this evaluation, compositions were prepared in substantially the same manner and using the same interpolymer as in Examples 3–4 except that the amount of dimethyl ethanolamine employed was such that the degree of neutralization of the interpolymer was 30 percent of theoretical neutralization (hereafter TN) in Example 5, 25 percent TN in Example 6, 20 percent TN in Example 7 and 15 percent TN in Example 8. Since the lower degrees of neutralization resulted in high composition viscosity (i.e., Examples 6–8), the solids content of these compositions were reduced by adding additional solvent in the form of an 80/20 mixture of deionized water and butyl Cellosolve. The resultant compositions had the following formulations and properties:

As can be seen from these examples, the stability of the composition depends upon the degree of neutralization and thus the amount of salt per gram of resin solids produced.

The above examples were repeated using monoethanolamine in place of dimethyl ethanolamine and showed similar stability results.

EXAMPLE 9

This example illustrates a water-based coating composition of this invention having low temperature baking properties.

In this example, the composition was prepared in substantially the same manner as in Examples 1–8 except that the monomer charge consisted of 10 percent acrylamide as NBMA, 10 percent acrylic acid, 30 percent ethyl acrylate and 50 percent styrene; the stripping procedure was carried out under vacuum, and the degree of neutralization of the acid groups of the interpolymer was 27 percent TN. The resultant composition had the following formulation and properties:

| Interpolymer (composition as above): | 35 percent by weight |
|---|---|
| Liquid medium*: | 65 percent by weight |
| Viscosity: | 340 centipoises, Brookfield viscosity at 77° F., No. 4 spindle at 20 r.p.m. |
| Acid number: | 25.3 |
| Milliequivalents of salt per gram of resin solids: | 0.375 |
| Stability | Good |

*82.3 percent by weight of deionized water and 17.7 percent by weight of organic solvents consisting of butyl Cellosolve, isopropanol, butanol and xylene.

The above composition when applied to a metal substrate can be cured in 4 minutes at 320° F. to produce a smooth, hard and durable film.

As indicated above, the compositions of this invention are especially adapted for use as internal sanitary liners for beverage containers. The fabrication of beverage containers (e.g., beer containers) and the application of sanitary liner compositions thereto are known in the art. The precise method of fabrication and internal sanitary liner application will vary depending on whether the beverage container is made in two pieces or three pieces.

For example, one method of producing a two piece can involves first forming a cup (e.g., by punch press) from metal sheet stock. The cup is then drawn into a container (i.e., can) of the desired size and trimmed. Following the trimming operation, the can is then cleaned, printed and varnish applied to the outside surface and bottom thereof. The can is then baked to cure the outside varnish coating. Then the internal

|  | EXAMPLE | | | |
|---|---|---|---|---|
|  | 5 | 6 | 7 | 8 |
| Interpolymer | ← (As in Example 4, above) → | | | |
| Percent theoretical neutralization | 30 | 25 | 20 | 15 |
| Total solids (weight percent) | 36.4 | 33.1 | 18.0 | 25 |
| Total liquid medium (weight percent) | 63.6 | 66.9 | 82.0 | 75 |
| Viscosity, No. 4 Ford cup, seconds at 77° F. | 26 | 31 | 25 | — |
| Acid number | 18.6 | 19.4 | 12.9 | 12.1 |
| Milliequivalents of salt per gram resin solids | 0.312 | 0.261 | 0.208 | 0.156 |
| Stability | Good | Good | Fair — Slight settling | Bad — two phase separation | sanitary liner composition is applied to the inside of the container by spraying and the can is again baked to cure the sanitary liner. Subsequently, (i.e., after the can is packed) a can end which has previously been stamped from the metal sheet stock and coated with sanitary liner is applied to the can, generally by double seaming to seal the can. For a method of producing three piece cans, see U.S. Pat. No. 3,117,693.

As indicated at the beginning of the specification, the sanitary liner of such beverage containers are subjected to a number of tests. These tests are performed on the liner both prior to and after the container is packed with beverages (e.g., beer). When such a container is packaged with beer and sealed, the beer is subjected to pasteurization and other normal processing operations. After the containers have been subjected to storage, they are opened and both the beer and the liner are evaluated. The following are some of the more important tests which have been developed to measure the sanitary liner compositions for beverage containers:
   a. metal adhesion;
   b. turbidity;
   c. extractability;
   d. taste; and
   e. pasteurization resistance.

In the following examples, designated 10–13, samples of the water-based coating compositions of Examples 1, 2, 4, and 9 (Examples 10–13 below) were applied to beverage container stock used to package beer and cured as indicated above. The cured sanitary liner compositions of the invention were then evaluated to determine their effectiveness in the above tests. Results are shown below.

EXAMPLES 10–13

|  | EXAMPLE | | | |
|---|---|---|---|---|
|  | 10 | 11 | 12 | 13 |
| Formulation | Ex. 1 | Ex. 2 | Ex. 4 | Ex. 9 |
| Type Test and Result: | | | | |
| Metal adhesion | P | P | P | P |
| Turbidity | P | P | P | P |
| Extractability | P | P | P | P |
| Taste | P | P | P | P |
| Pasteurization resistance | P | P | P | P |

P = Passed.

As can be seen from the above, the compositions of this invention passed all of the important tests for sanitary liners.

It should be observed that a composition similar in formulation to Example 1, except that it contained 2.5 percent mercaptoethanol chain transfer agent, failed to pass the taste test.

Definitions of the tests used in the above examples are as follows:

Metal Adhesion - The cured liner is tested for adhesion both prior to and after being in contact with the beer. The adhesion test employed is the standard cross-hatch adhesion test wherein the scribe lines are cut through the cured film to the substrate below, pressure-sensitive adhesive tape is applied to the film and lifting of the film is attempted. The test is performed on both the original cured liner and the liner after being immersed in beer under pasteurization conditions. In order to pass the test, the film must not lift from the substrate.

Turbidity - This test is performed by packing beer in a container coated with the sanitary liner and storing the container for periods of up to one month. In order to pass the test, the beer must not show any turbidity after storage for 1 month.

Extractability - This test is conducted to ascertain whether the coating compositions meets FDA (Food and Drug Administration) guidelines and is performed by applying the coating composition to metal foil and then curing. The foil is then immersed in various extractants at 150° F. for 2 hours and 120° F. until equilibrium (72 hours). The extractant solutions are water, 8 percent ethanol in water, 3 percent acetic acid in water, and heptane. The extractant solutions are dried and residues recorded. The residues are reported as milligrams per square inch (mg./in.$^2$) of coating.

Taste - This test measures the influence of cured coatings on beer taste. The test is performed by packing beer in containers containing the cured liner and then storing the beer for various time periods (e.g., 1–6 months) at periodic intervals subjecting the beer to a taste panel for evaluation.

A control, which is a packed beer container having a vinyl coating is often employed. Members of the beer panel evaluate the beer for bitterness, acid taste, and the like. In order to pass the test, approval of the panel is required.

Pasteurization Resistance - The pasteurization resistance is determined by immersing the cured liner in beer at a temperature of 160° F. for 30 minutes. In order to pass the test, the film must show no blushing and adhesion must be unaffected. Adhesion is also checked during the evaluation by the standard cross hatch adhesion test. After immersion in beer, pressure sensitive tape is applied to the film and lifting is attempted. To pass the test, the film must not lift from the substrate.

According to the provisions of the Patent Statutes, there are described above the invention and what are now considered to be its best embodiments. However, within the scope of the appended claims, it is to be understood that the invention can be practiced otherwise than as specifically described.

We claim:
1. A metal container containing a beverage and having its internal surface coated with an adherent sanitary liner, the coating which is in contact with said beverage being a cured layer of a water-based coating composition consisting essentially of:
   A. from about 5 percent to about 60 percent by weight of an amine-neutralized or partially-neutralized interpolymer formed in the presence of a vinyl polymerization catalyst and in the absence of mercaptan, said interpolymer being comprised of:
      1. from about 5 percent to about 25 percent of acrylamide or methacrylamide in units of the structure:

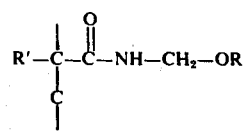

where R' is methyl or hydrogen and R is hydrogen or lower alkyl with at least 50 percent of the groups represented by R being lower alkyl;
      2. from about 3 percent to about 25 percent of units formed by vinyl polymerization of ethylenically unsaturated carboxylic acid selected from the group consisting of acrylic acid, methacrylic acid, itaconic acid, crotonic acid and maleic acid and half esters of maleic and fumaric acids;

3. from about 5 percent to about 75 percent of units derived by vinyl polymerization of hardening monomer selected from the group consisting of styrene, vinyl toluene and alkyl methacrylates having 1 to 4 carbon atoms; and 4. from about 5 percent to about 75 percent of units formed by vinyl polymerization of flexibilizing monomer selected from the group consisting of alkyl acrylates having up to 13 carbon atoms in each alkyl group and alkyl methacrylates having from 5 to 16 carbon atoms in each alkyl group;

wherein said interpolymer is solubilized by neutralizing or partially neutralizing the acid groups of said interpolymer with a sufficient amount of monomeric amine to produce at least 0.200 milliequivalents of salt per gram of resin solids; and B. from about 40 percent to about 95 percent by weight of a liquid medium consisting of a mixture of water-soluble or water-miscible organic solvents and water, wherein at least 60 percent by weight of the mixture is water.

2. The container of claim 1 wherein said beverage is selected from the group consisting of beer, carbonated soft drinks, non-carbonated soft drinks, and fruit juice.

3. A metal container containing a beverage and having its internal surface coated with an adherent sanitary liner, the coating which is in contact with said beverage being a cured layer of a water-based coating composition consisting essentially of:

A. from about 15 percent to about 40 percent by weight of an amine-neutralized or partially-neutralized interpolymer formed in the presence of a vinyl polymerization catalyst and in the absence of mercaptan, said interpolymer being comprised of:

1. from about 10 percent to about 15 percent of acrylamide or methacrylamide in units of the structure:

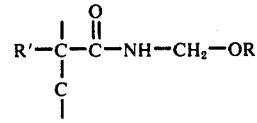

where R' is methyl or hydrogen or R is hydrogen or lower alkyl with at least 50 percent of the groups represented by R being lower alkyl;

2. from about 5 percent to about 15 percent of units formed by vinyl polymerization of ethylenically unsaturated carboxylic acid selected from the group consisting of acrylic acid, methacrylic acid, itaconic acid, crotonic acid and maleic acid and half esters of maleic and fumaric acids;

3. from about 40 percent to about 60 percent of units derived by vinyl polymerization of hardening monomer selected from the group consisting of styrene, vinyl toluene and alkyl methacrylates having 1 to 4 carbon atoms; and 4. from about 20 percent to about 50 percent of units formed by vinyl polymerization of flexibilizing monomer selected from the group consisting of alkyl acrylates having up to 13 carbon atoms in each alkyl group and alkyl methacrylates having 5 to 16 carbon atoms in each alkyl group; wherein said interpolymer is solubilized by neutralizing or partially-neutralizing the acid groups of said interpolymer with a sufficient amount of monomeric amine to produce at least 0.200 milliequivalents of salt per gram of resin solids; and B. from about 60 to about 85 percent by weight of a liquid medium consisting of a mixture of water-soluble or water-miscible organic solvents and water wherein at least 60 percent by weight of the mixture is water.

4. The container of claim 3 wherein said beverage is selected from the group consisting of beer, carbonated soft drinks, non-carbonated soft drinks, and fruit juice.

* * * * *